No. 842,835. PATENTED JAN. 29, 1907.
C. L. HUTCHESON.
BRICK HOLDER FOR USE IN THE CARE OF LIVE STOCK.
APPLICATION FILED MAY 11, 1906.

Witnesses:
Inventor
Caswell L. Hutcheson

UNITED STATES PATENT OFFICE.

CASWELL L. HUTCHESON, OF CHATTANOOGA, TENNESSEE.

BRICK-HOLDER FOR USE IN THE CARE OF LIVE STOCK.

No. 842,835.     Specification of Letters Patent.     Patented Jan. 29, 1907.

Application filed May 11, 1906. Serial No. 316,396.

*To all whom it may concern:*

Be it known that I, CASWELL L. HUTCHESON, a citizen of the United States, residing at Chattanooga, in the county of Hamilton and State of Tennessee, have invented new and useful Improvements in Brick-Holders for Use in the Care of Live Stock, of which the following is a specification.

This invention relates to brick-holders for a salt or a medicated salt block or brick, the latter being consumed by an animal licking it; and the invention aims to provide a holder of such class wherein the block or brick is held stationary and a portion thereof exposed so that the animal may readily reach and consume the same by licking. Furthermore, the holder is so constructed as to prevent the animal throwing out the entire brick from the holder owing to a lifting or pushing action.

The invention further aims to provide a holder for a salt or a medicated salt block or brick which shall be simple in its construction, strong, durable, efficient in its use, readily set up in a feed box or trough, and inexpensive to manufacture.

With the foregoing and other objects in view the invention consists of the novel construction, combination, and arrangement of parts hereinafter more specifically described, and illustrated in the accompanying drawings, wherein is shown the preferred embodiment of the invention; but it is to be understood that changes, variations, and modifications can be resorted to which come within the scope of the claims hereunto appended.

Figure 1:
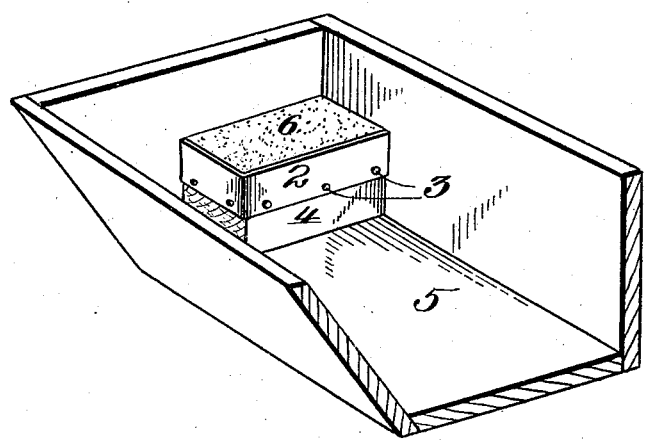
Figure 2:
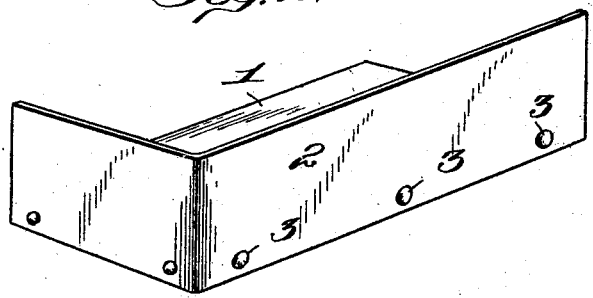
Figure 3:
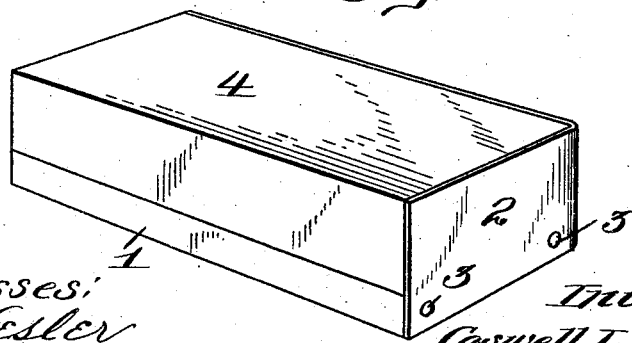

In the drawings, wherein like reference characters denote corresponding parts throughout the several views, Figure 1 is a view of a portion of a feed box or trough, showing a holder according to this invention arranged therein. Fig. 2 is a perspective view of the holding member, and Fig. 3 is a perspective view showing the parts assembled ready for shipment.

A brick-holder in accordance with this invention comprises two members, one of which is termed the "holding" member and the other of which is termed the "supporting" member. The function of the holding member, in connection with one side and one end wall of the feed trough or box, is to hold the salt or medicated salt block or brick in position for the animal to lick, and the function of the supporting member is not only to support the holding member, but also to raise the holding member above the bottom of the feed-box, thus preventing grain or moisture from getting into it. Although but one supporting member is shown, yet it is evident that a plurality of such members can be employed. Preferably the supporting member is of a size substantially equal to that of the brick, so that when shipping the holder the supporting member can be placed into the holding member, and thereby form a neat compact package when wrapped.

The holding member is formed of a bottom-section 1 and a wall-section 2, the bottom-section 1 conforming to the outline of the bottom of the block or brick. Preferably the bottom-section 1 is rectangular in contour and is formed of any suitable material, but preferably of wood, so that holdfast devices can be forced therethrough. The wall-section 2 conforms in contour to one side and one end of the bottom-section 1, and, as shown, the wall-section is substantially L-shaped in contour, so as to form an end and a side wall. The wall-section 2 is constructed of metallic material and is secured to the bottom-section 1 through the medium of the holdfast devices 3. When the holder is set up in position for retaining the block or brick stationary within the feed trough or box, the other side wall and end wall for the holder is constituted by a portion of one side and one end wall of the feed trough or box, as shown in Fig. 1.

The supporting member is indicated by the reference character 4, is substantially rectangular in contour, and of sufficient height to raise the holding member above the bottom of the feed-box, so as to prevent grain or moisture getting into the holding member.

When using the holder, it should be placed in the corner of the feed box or trough 5, so that one side and one end wall of the feed-box will protect the open side and end of the holding member, thereby retaining in position the block or brick 6. Before securing the holding member in position the supporting member is nailed to the bottom of the feed-box in the corner, as stated, and the holding member placed upon and secured by suitable holdfast devices on the top of the supporting member.

Although the invention is designed for holding a salt or a medicated salt brick, yet it is evident that it can be used for other purposes for which it is found applicable.

Having thus fully described my invention, what I claim as new, and desire to secure by Letters Patent, is—

1. A brick-holder comprising a holding and a supporting member, said holding member associating with two walls of a feed-box and having one open side and one open end and said holding member adapted to be secured to said supporting member, the latter adapted to be secured to the bottom of the feed-box.

2. A brick-holder comprising the combination with a supporting member adapted to be secured to the bottom of a feed-box, of a holding member associating with two walls of the feed-box and consisting of a bottom-section and an L-shaped wall-section secured to one end and one side of said bottom-section.

3. A brick-holder comprising a rectangular supporting member adapted to be secured to the bottom of a feed-box, combined with a holding member associating with two walls of the feed-box and consisting of a bottom-section and an L-shaped wall-section, said bottom-section adapted to be secured to said supporting member.

4. A brick-holder comprising a rectangular supporting member adapted to be secured to the bottom of a feed-box, combined with a holding member associating with two walls of the feed-box and consisting of a bottom-section and an L-shaped wall-section, said bottom-section adapted to be secured to said supporting member, the supporting member of a size so as to enable it to snugly nest in said holding member.

In testimony whereof I have hereunto set my hand in presence of two subscribing witnesses.

CASWELL L. HUTCHESON.

Witnesses:
W. L. BOGAN,
CHAS. S. HYER.